May 7, 1968
J. E. PERKINS
3,382,415
METER HOLDER FOR RINGLESS METER SOCKET
Filed Jan. 13, 1966
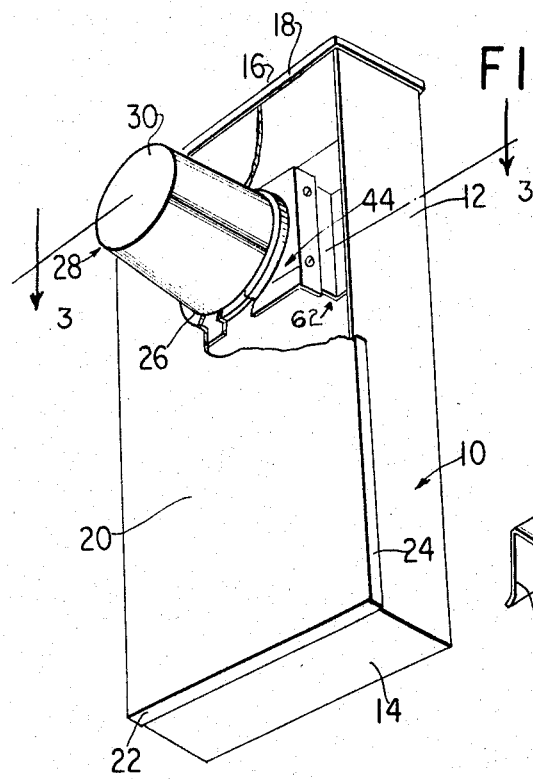
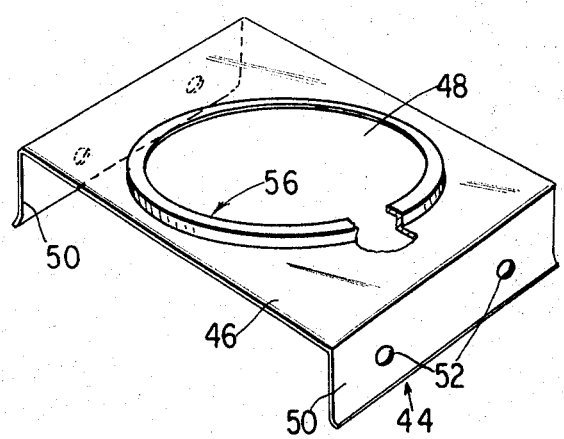
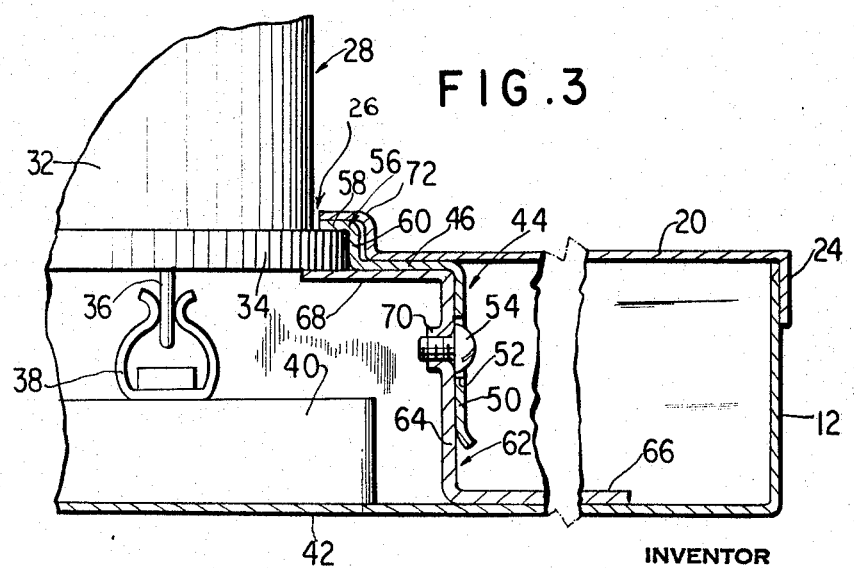
INVENTOR
JOHN E. PERKINS
BY
Smythe & Moore
ATTORNEYS

United States Patent Office 3,382,415
Patented May 7, 1968

3,382,415
METER HOLDER FOR RINGLESS METER SOCKET
John E. Perkins, Manchester, N.H., assignor to Sola Basic Industries, Inc., Milwaukee, Wis., a corporation of Wisconsin
Filed Jan. 13, 1966, Ser. No. 520,322
4 Claims. (Cl. 317—104)

ABSTRACT OF THE DISCLOSURE

A ringless meter socket device including an open box with socket means for receiving a meter, and a bracket mounted in the box for supporting the meter, and a meter holding means engageable with the meter and releasably engaging the bracket for mounting the meter within the box.

---

The present invention relates to a socket type meter enclosure or device, and more particularly to a ringless socket meter for use in conjunction with watt hour meters or the like.

Socket type meter devices that are now commonly used comprise a metal box or enclosure in which are disposed terminal jaws for receiving the terminal posts or blades of a socket type meter, and a detachable closure or cover for the box having a circular opening provided therein for mounting the meter therein.

Usually the closures or covers are provided with an integral flanged ring that surrounds the circular opening, and the base of the meter seats upon the flanged ring. A split sealing ring of channel cross section is provided for securing the base of the meter to said flanged ring to provide a water-tight seal between the meter and the box.

In this type of construction, in order to remove the cover or closure of the box, it is first necessary to remove the meter from the socket. This requires unclamping of the sealing ring and removal of the sealing ring so that the meter can be removed from the socket, and thereafter the cover of the box can be removed.

It is an object of the present invention to provide a meter holder for use with a ringless type socket meter, which holder will secure the meter to the enclosure or meter box and which will permit the cover of the box to be removed without disturbing the meter holder or the meter.

In one aspect of the invention, the meter box has a meter support means therein which may comprise a pair of brackets. The removable cover has an aperture through which the meter can protrude. A meter holder is snappable onto said brackets, the holder having an aperture therein for receiving the meter. The holder will hold the meter in place before the cover is placed thereon.

Other objects, advantages and features of the present invention will be readily apparent from the following description and drawings which are merely exemplary.

In the drawings:

FIG. 1 is a perspective view, partly broken away, illustrating the ringless socket type meter embodied in the present invention;

FIG. 2 is a perspective enlarged detailed view of the meter holder embodied in the invention; and FIG. 3 is an enlarged sectional view taken generally in the direction of line 3—3 of FIG. 1.

Reference numeral 10 designates a meter box or enclosure that is substantially of rectangular configuration and wherein the base has opposite side walls 12, a bottom wall 14 and a top wall 16. The top wall 16 is provided with a downwardly extending rim or edge 18 which extends over the front opening of the box. The cover 20 has an inturned rim 22 extending along its bottom and inturned rims 24 extending along the opposite side edges thereof. The upper edge of the front cover is insertable under the lip or edge 18 when the cover 20 is put into final closed position.

The cover 20 is provided with a circular opening 26 therein adjacent its upper end so as to permit the glass or other material portion of meter 28 to extend therethrough. The meter 28 is substantially cylindrical in configuration and tapers from its outer end 30 to a point adjacent its inner end 32 at which its diameter is substantially greater than the outer end 30. The meter 28 is provided with a conventional annular flange portion 34 adjacent its larger end 32.

The rear side of the meter 28 is provided with the usual terminal blades or posts 36 adapted to be received in the terminal jaws 38 mounted on the insulation blocks 40 secured to the rear wall 42 of the meter box 10.

Disposed within the meter box is a meter holder 44 which comprises a substantially flat middle portion 46 having a central opening 48 therein and provided with oppositely disposed legs 50 extending from the opposite edges of the plate 46 and disposed at substantially a right angle with respect thereto. Legs 50 with the flat middle portion 46 form a U-shaped member, said legs being springable outwardly as explained hereafter. The legs 50 are provided with spaced holes or apertures 52 therein for receiving appropriate parts of bolts or other similar members 54 therein. The meter holder 44 is provided with a projecting inturned flange member 56 around the opening 48 formed by an inturned horizontal rim 58 and an upturned vertical rim 60. The internal flange member 56 is adapted to bear against the outer surfaces of the annular flange portion 34 of the meter 28 so as to hold it against a bracket member 62 secured within the interior of the meter box 10.

The bracket 62 comprises a vertical portion 64 and a bottom portion or leg 66 and a top leg or portion 68. The bottom portion 66 is secured by any suitable means to the inner surface of the rear wall 42 of box 10. The bottom portion 66 of the bracket 62 extends outwardly toward the side wall 12 of the box 10 while the upper or inner portion or leg 68 extends inwardly of the vertical portion 64 and away from the side wall 12 of the box. The middle portion 64 is provided with internally threaded openings 70 therein to receive the threaded bolt members 54. Bracket members 62 are disposed on each side of box 10 so as to be properly positioned to receive the bottom of the annular flange portion 34 of the member 28 as shown in FIG. 3. The meter holder 44 is held in place by the bolt members 54 entering apertures 52, as shown in FIG. 3, so that the inturned rim 58 will secure the annular flange 34 between its inner surface and the inner portion of the leg 68 of the bracket. The bolt members 54 also could be in the form of headed rivets or suitably shaped studs. Further, the holes and bolt members could be reversed (not shown).

The cover member 20 is provided with an inturned annular flange portion 72 adjacent the circular opening 26 so that the cover member will not make contact with the surface of the meter and so that the cover 20 can be readily removed from the box without disturbing the meter 28.

The annular inturned flange portion 72 of the cover 20 is of a sufficient size so that the cover 20 can be positioned on the meter box 10 with the rims 22 and 24 of the cover properly disposed adjacent their bottom and side walls respectively, and so that the upper edge of the cover 20 can be manipulated in order to fit underneath the rim 18 of the top wall 16.

The meter holder 44 is disposed so that its middle horizontal plate portion 46 is substantially disposed adjacent the outer edge of the side wall 12 so that the cover 20 properly seats against this middle portion 46 and against the outer edge of the side wall 12, as is best seen in FIG. 3.

In assembly, the meter base 34 is placed in position on brackets 68. The aperture 48 of meter holder 44 then is placed over the meter and is snapped into position, legs 50 being springable outwardly so as to slip over the heads of the screws 54 until apertures 52 register therewith. At this time, the legs 50 will snap into place and the meter holder 44 will hold the meter in position. The cover 20 then can be put in place.

From the foregoing description it is apparent that the present invention provides a meter holder for a ringless socket type meter in which the meter holder can be secured to a bracket that is disposed within the meter box, and a cover member disposed over the opening of the meter box, which cover member seats against the meter holder so as to form a water-tight seal therewith and entirely closes off the front opening of the box.

Inasmuch as various changes may be made in the form, location and relative arrangement of the several parts, without departing from the essential characteristics of the invention, it will be understood that the invention is not to be limited except by the scope of the appended claims.

What is claimed is:

1. A ringless meter socket device comprising an open box with a bottom and side and end walls, upstanding bracket means secured to said bottom, laterally projecting leg means on said bracket means, a socket type meter having a substantially flat flanged base, socket means in said box for mounting said meter therein, said leg means engaging and supporting the base of said meter relative to said socket means, headed means secured to and projecting from said upstanding bracket means, meter holding means having an opening engageable with said flanged meter base, said meter holding means having inturned leg means engageable with said upstanding bracket means, and apertures in said inturned leg means for receiving said headed means whereby said meter flange and said meter are clamped in said box.

2. In a ringless meter socket device according to claim 1, wherein said meter holding means is bent upwardly and laterally adjacent the opening therein for engaging said flanged meter base.

3. In a ringless meter socket device according to claim 1, wherein said meter holding means and said leg means thereon engage said laterally projecting leg means and said upstanding bracket means, and a removable cover disposed on top of said box, said cover having an opening of sufficient size for said meter to extend therethrough.

4. In a ringless meter socket device according to claim 3, wherein said cover is bent upwardly and laterally adjacent said opening whereby said cover engages with said meter holding means.

References Cited
UNITED STATES PATENTS

| | | | |
|---|---|---|---|
| 1,965,329 | 9/1934 | Abbott | 317—105 X |
| 2,142,048 | 12/1938 | Davis et al. | 317—105 X |
| 2,182,603 | 12/1939 | Walker et al. | 317—105 |
| 3,215,873 | 11/1965 | Kruger et al. | 248—361 X |

ROY D. FRAZIER, *Primary Examiner.*

J. F. FOSS, *Assistant Examiner.*